United States Patent
Romano et al.

(10) Patent No.: US 7,502,336 B2
(45) Date of Patent: Mar. 10, 2009

(54) MULTI-CARRIER COMMUNICATION USING ADAPTIVE TONE-PRUNING

(75) Inventors: Pasquale Romano, Los Gatos, CA (US); Hossein Sedarat, San Jose, CA (US); Kevin Fisher, Palo Alto, CA (US)

(73) Assignee: 2Wire, Inc., San Jose, CA (US)

( * ) Notice: Subject to any disclaimer, the term of this patent is extended or adjusted under 35 U.S.C. 154(b) by 963 days.

(21) Appl. No.: 10/883,520

(22) Filed: Jun. 30, 2004

(65) Prior Publication Data

US 2006/0002457 A1  Jan. 5, 2006

(51) Int. Cl.
*H04B 3/20* (2006.01)
(52) U.S. Cl. .................................... 370/286
(58) Field of Classification Search ............ None
See application file for complete search history.

(56) References Cited

U.S. PATENT DOCUMENTS

| | | | |
|---|---|---|---|
| 6,266,347 B1 * | 7/2001 | Amrany et al. ........... 370/478 |
| 6,345,071 B1 | 2/2002 | Hamdi | |
| 6,363,109 B1 | 3/2002 | Polley et al. | |
| 6,445,773 B1 | 9/2002 | Liang et al. | |
| 6,493,395 B1 * | 12/2002 | Isaksson et al. ........... 370/203 |
| 6,775,241 B1 * | 8/2004 | Levin ..................... 370/468 |
| 6,798,735 B1 * | 9/2004 | Tzannes et al. ........... 370/252 |
| 6,839,429 B1 * | 1/2005 | Gaikwad et al. .......... 379/417 |
| 7,356,049 B1 * | 4/2008 | Rezvani .................. 370/484 |
| 2001/0011019 A1 | 8/2001 | Jokimies | |
| 2001/0055332 A1 * | 12/2001 | Sadjadpour et al. ....... 370/201 |
| 2002/0044597 A1 * | 4/2002 | Shively et al. ............ 370/344 |
| 2003/0099350 A1 * | 5/2003 | Bostoen et al. ........... 379/417 |
| 2005/0190825 A1 * | 9/2005 | Sedarat .................... 375/222 |
| 2006/0171480 A1 * | 8/2006 | Erving et al. ............. 375/260 |

OTHER PUBLICATIONS

Bingham, J. "Multicarrier Modulation for Data Transmission: An Idea Whose Time Has Come" IEEE Communications Magazine, May 1990, pp. 5-14.*

(Continued)

*Primary Examiner*—Anh-Vu H Ly
(74) *Attorney, Agent, or Firm*—Blakely, Sokoloff, Taylor & Zafman LLP

(57) ABSTRACT

An apparatus, system, and method are described for multi-carrier communication using adaptive tone-pruning. The method may include transmitting a data-bearing signal over a plurality of tones on a communication loop within a plurality of communication loops and calculating a minimum tone cost according to a tone cost algorithm. The tone cost algorithm defines a tone cost associated with a selected tone within the plurality of tones. The tone cost of the selected tone is based on a predefined loading frequency and a signal-to-noise ration (SNR) of the selected tone. The method also may include determining a bit loading pattern for the data-bearing signal according to the minimum tone cost. This determination may occur in response to a determination that a minimum allowable transmission power is greater than a minimum required transmission power for the data-bearing signal.

36 Claims, 8 Drawing Sheets

OTHER PUBLICATIONS

International Preliminary Report on Patentability, PCT/US2005/023634 filed Jun. 30, 2005, mailed Jan. 18, 2007.
PCT Search Report, International Application No. PCT/US05/23634, International Filing Date Jun. 30, 2005, mailed May 4, 2006.
PCT Written Opinion of the International Searching Authority, International Application No. PCT/US05/23634, International Filing Date Jun. 30, 2005, mailed May 4, 2006.
Fischer, Robert F.H., et al., "A New Loading Algorithm for Discrete Multitone Transmission," IEEE, 1996, pp. 724-728.
Jorge Campello, "Optimal Discrete Bit Loading for Multicarrier Modulation Systems", ISIT 1998, Cambridge, MA, USA, Aug. 16-Aug. 21, 1998 IEEE, p. 193.
Lampe, Lutz H.-J., et al., "Performance Evaluation of Non-Coherent Transmission over Power Lines," 8 pgs, In Proceedings of Int. Symposium on Power-Line Communications (ISPLC 2000), pp. 23-30, Limerick, Ireland, Apr. 2000.
Wyglinski et al., "An Efficient Bit Allocation Algorithm for Multicarrier Modulation", Proc. IEEE Wireless Commun., Networking Conf. (Atlanta, GA), Paper B13-3, 4 pp., Mar. 2004.
Baccarelli et al., "Novel Efficient Bit-Loading Algorithms for Peak-Energy-Limited ADSL-Type Multicarrier Systems", IEEE Transactions on Signal Processing, vol. 50, No. 5, May 2002.
Chow et al., "A Practical Discrete Multitone Transceiver Loading Algorithm for Data Transmission over Spectrally Shaped Channels", IEEE Transactiosn on Communications, vol. 43, No. 2/3/4, Feb./Mar./Apr. 1995, pp. 773-775.
Sonalkar et al., "An Efficient Bit-Loaidng algorithm for DMT Applications", IEEE Communications Letters, vol. 4, No. 3, Mar. 2000, pp. 80-82.
Kamkar-Parsi et al., Wideband Crosstalk Interface Cancelling on xDSL Using Adaptive Signal Processing and Common Mode Signal, 2004 IEEE, pp. IV-1045-IV-1048.

* cited by examiner

| Tone Costs using SNR-Pruning | | | | |
|---|---|---|---|---|
| | Long Loop | | Short Loop | |
| Tone | SNR(t) (dB) | Cost(t) ($\times 10^{-6}$) | SNR(t) (dB) | Cost(t) ($\times 10^{-6}$) |
| 1 | 37 | 200 | 56 | 2.51 |
| 2 | 35 | 316 | 59 | 1.26 |
| 3 | 32 | 631 | 59 | 1.26 |
| 4 | 27 | 1995 | 58 | 1.58 |
| 5 | 23 | 5012 | 58 | 1.58 |
| 6 | 19 | 12589 | 57 | 2.00 |
| 7 | 15 | 31623 | 57 | 2.00 |
| 8 | 0 | 1000000 | 57 | 2.00 |
| 9 | 0 | 1000000 | 56 | 2.51 |
| 10 | 0 | 1000000 | 56 | 2.51 |
| 11 | 0 | 1000000 | 55 | 3.16 |
| 12 | 0 | 1000000 | 54 | 3.98 |
| 13 | 0 | 1000000 | 53 | 5.01 |
| 14 | 0 | 1000000 | 52 | 6.31 |
| 15 | 0 | 1000000 | 51 | 7.94 |
| 16 | 0 | 1000000 | 49 | 12.59 |
| 17 | 0 | 1000000 | 47 | 19.95 |
| 18 | 0 | 1000000 | 42 | 63.10 |
| 19 | 0 | 1000000 | 37 | 199.53 |

FIG. 4a

| Downstream Bitrate (kbps) for Long Communication Channel | | | |
|---|---|---|---|
| Total Length of Long Communication Channel (kft) | Number of Short Communication Channels | | |
| | 0 | 1 | 24 |
| 12 | 3808 | 1056 | 448 |
| 13 | 2880 | 704 | 224 |
| 14 | 2144 | 416 | 64 |
| 15 | 1568 | 224 | 0 |
| 16 | 1120 | 96 | 0 |
| 17 | 736 | 0 | 0 |
| 18 | 480 | 0 | 0 |
| 19 | 256 | 0 | 0 |
| 20 | 128 | 0 | 0 |

FIG. 4b

| Tone Costs using Adaptive-Pruning | | | | |
|---|---|---|---|---|
| | Long Loop | | Short Loop | |
| Tone | SNR(t) (dB) | Cost(t) (x$10^{-4}$) | SNR(t) (dB) | Cost(t) (x$10^{-4}$) |
| 1 | 37 | 646 | 56 | 8.14 |
| 2 | 35 | 914 | 59 | 3.64 |
| 3 | 32 | 1615 | 59 | 3.22 |
| 4 | 27 | 4489 | 58 | 3.57 |
| 5 | 23 | 9823 | 58 | 3.11 |
| 6 | 19 | 21276 | 57 | 3.37 |
| 7 | 15 | 45537 | 57 | 2.87 |
| 8 | 0 | 1210001 | 57 | 2.41 |
| 9 | 0 | 1000001 | 56 | 2.51 |
| 10 | 0 | 810001 | 56 | 2.03 |
| 11 | 0 | 640001 | 55 | 2.02 |
| 12 | 0 | 490001 | 54 | 1.95 |
| 13 | 0 | 360001 | 53 | 1.80 |
| 14 | 0 | 250001 | 52 | 1.58 |
| 15 | 0 | 160001 | 51 | 1.27 |
| 16 | 0 | 90001 | 49 | 1.13 |
| 17 | 0 | 40001 | 47 | 0.80 |
| 18 | 0 | 10001 | 42 | 0.63 |
| 19 | 0 | 1.00 | 37 | 0.00 |

FIG. 7a

| Downstream Bitrate (kbps) for Long Communication Channel | | | |
|---|---|---|---|
| Total Length of Long Communication Channel (kft) | Number of Short Communication Channels | | |
| | 0 | 1 | 24 |
| 12 | 3808 | 3136 | 3008 |
| 13 | 2880 | 2624 | 2424 |
| 14 | 2144 | 2080 | 1952 |
| 15 | 1568 | 1568 | 1472 |
| 16 | 1120 | 1120 | 1056 |
| 17 | 736 | 736 | 736 |
| 18 | 480 | 480 | 448 |
| 19 | 256 | 256 | 256 |
| 20 | 128 | 128 | 128 |

FIG. 7b

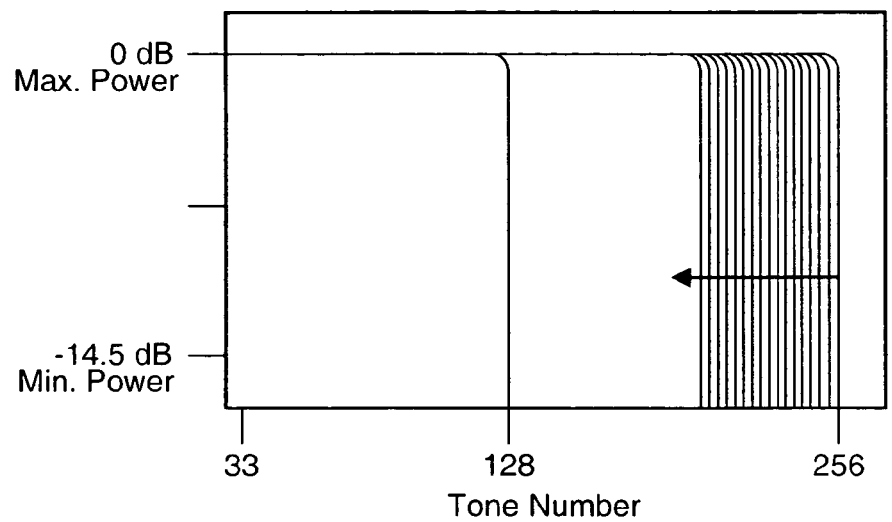
FIG. 9a
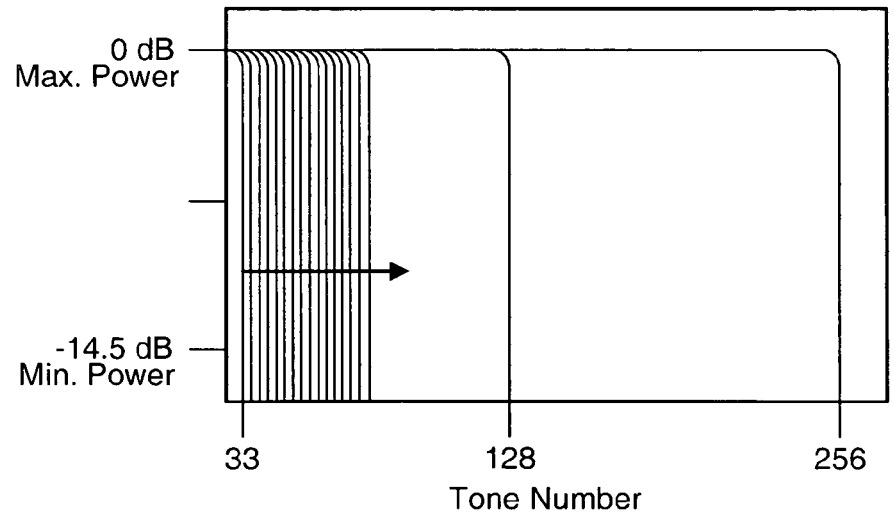
FIG. 9b
1000
$$Loss = 1 - \frac{Rate_1}{Rate_0}$$
FIG. 10a
518
$$Cost(t) = \begin{cases} (t-t_0)^{2n}, & t < t_0 \\ t_{MAX}^{2n}, & t \geq t_0 \end{cases}$$
FIG. 10b

MULTI-CARRIER COMMUNICATION USING ADAPTIVE TONE-PRUNING

TECHNICAL FIELD

Embodiments of the present invention pertain to the field of communication systems and, more particularly, to multi-carrier communication systems.

BACKGROUND

A multi-carrier communication system, such as Discrete Multi-Tone (DMT) system, carries information from a transmitter to a receiver over a number of tones. Each tone may be a group of one or more frequencies defined by a center frequency and a set bandwidth. The tones are also commonly referred to as sub-carriers or sub-channels. As used herein, the terms tone and frequency may be used interchangeably.

DMT communication systems use a modulation method in which the available bandwidth of a communication loop, such as twisted-pair copper media, is divided into these numerous sub-channels. A communication loop may also be known as a communication channel. However, to avoid confusion, the term channel is used herein in reference to tones and frequencies, rather than physical communication media. The term communication loop is understood to refer generally to physical communication media, including copper, optical fiber, and so forth, as well as communication signal paths, including radio frequency (RF) and other physical or non-physical communication signal paths.

There are various sources of interference and noise in a multi-carrier communication system. Interference and noise may corrupt the data-bearing signal on each tone as the signal travels through the communication loop and is decoded at the receiver. The transmitted data-bearing signal may be decoded erroneously by the receiver because of this signal corruption.

In order to account for potential interference on the transmission line and to guarantee a reliable communication between the transmitter and receiver, each tone can merely carry a limited number of data bits per unit time. This number is related to a bit error rate (BER) for a given tone. The number of data bits or the amount of information that a tone carries may vary from tone to tone and depends on the relative power of the data-bearing signal compared to the power of the corrupting signal on that particular tone. The number of bits that a specific tone may carry decreases as the relative strength of the corrupting signal increases.

A reliable communication system is usually defined as a system in which the probability of an erroneously detected data bit by the receiver is always less than a target value. It is a common practice to model the aggregate sources of corruption associated with each tone as a single additive noise source with Gaussian distribution. Some exemplary sources of destructive noise sources include thermal energy, AM radio waves, and inter-loop cross-talk. Under the assumption of a Gaussian distribution, the signal-to-noise power ratio (SNR) becomes a factor in determining a bit rate—the maximum number of data bits a tone can carry reliably. Given a fixed bit rate (or data transfer rate) on a tone, the effects of noise sources on the communication channel should be reduced in order to reduce the error rate on that tone.

The SNR of a tone may decrease as the length of the communication loop increases. Hence, a short communication loop may likely have a higher SNR than a long communication loop, where the length of the communication loop refers to the distance of the communication signal path between the transmitter and the location at which the SNR is calculated or measured. Where a long communication loop has a low SNR and a nearby short communication loop has sufficient transmission power, the signal on the short communication loop may cause noise that interferes with the data-bearing signal on the long communication loop. This noise is known as cross-talk. In many cases, decreasing the transmission power of the signal on the short communication loop will not significantly eliminate the noise that results on the long communication loop.

One technology, Dynamic Spectral Management (DSM), is a fairly complex tool that may be used to jointly optimize rates for the entire binder. However, DSM can be complex and have high associated costs.

A conventional bit-loading algorithm usually loads the data bits on tones with the highest SNR. This is to achieve the maximum noise margin and/or minimum transmission power. Because the typical SNR profile in an ADSL line drops with frequency, a conventional bit-loading algorithm activates the low frequency tones with the highest SNR and, correspondingly, deactivates tones with the lowest SNR. This implementation can be referred to as an SNR-pruning method.

However, SNR-pruning schemes employed on short communication loops tend to concentrate transmission signals for the short communication loop on tones that overlap with the tones used for long communication loops. Although overall transmission power may be reduced with SNR-pruning, noise and interference on the long communication channel are not necessarily reduced.

SUMMARY

Embodiments of an apparatus, system, and method are described for multi-carrier communication using adaptive tone-pruning. In one embodiment, a method may include transmitting a data-bearing signal over a plurality of tones on a communication loop within a plurality of communication loops and calculating a minimum tone cost according to a tone cost algorithm. The tone cost algorithm defines a tone cost associated with a selected tone within the plurality of tones. The tone cost of the selected tone is based on a predefined loading frequency and a signal-to-noise ratio (SNR) of the selected tone. The method also may include determining a bit loading pattern for the data-bearing signal according to the minimum tone cost. This determination may occur in response to a determination that a minimum allowable transmission power is greater than a minimum required transmission power for the data-bearing signal.

Other features and advantages of the present invention will be apparent from the accompanying drawings and the detailed description that follows.

BRIEF DESCRIPTION OF THE DRAWINGS

Embodiments of the present invention are illustrated by way of example and are not intended to be limited by the figures of the accompanying drawings, in which:

FIG. 4a illustrates a table of tone costs on long and short communication loops using SNR-pruning;

FIG. 4b illustrates a table of an embodiment of downstream bit rates on a long communication loop in the presence of a short communication loop using SNR-pruning;

FIG. 7a illustrates a table of an embodiment of tone costs on a short communication loop using adaptive-pruning;

FIG. 7b illustrates a table of an embodiment of downstream bit rates on a long communication loop when adaptive pruning is used on one or more corresponding short communication loops;

FIG. 9a illustrates a graph of an embodiment of top-pruning over a number of tones;

FIG. 9b illustrates a graph of an embodiment of bottom-pruning over a number of tones;

FIG. 10a illustrates one embodiment of a percentage loss algorithm; and

FIG. 10b illustrates one embodiment of an alternative adaptive-pruning cost algorithm.

DETAILED DESCRIPTION

In the following detailed description, numerous specific details are set forth in order to provide a thorough understanding of the invention. However, it will be understood by those skilled in the art that certain embodiments of the present invention may be practiced without these specific details. In other instances, well-known methods, procedures, components, and circuits have not been described in detail so as not to obscure the presented embodiments of the invention.

The following detailed description includes several modules, which will be described below. These modules may be implemented by hardware components or may be embodied in machine-executable instructions, which may be used to cause a general-purpose or special-purpose processor programmed with the instructions to perform the operations described herein. Alternatively, the operations may be performed by a combination of hardware and software.

Apparatuses, systems, and methods for multi-carrier communication using adaptive tone-pruning are described. In one embodiment, a method may include transmitting a data-bearing signal over a plurality of tones on a communication loop within a plurality of communication loops and calculating a minimum tone cost according to a tone cost algorithm. The tone cost algorithm defines a tone cost associated with a selected tone within the plurality of tones. The tone cost of the selected tone is based on a predefined loading frequency and a signal-to-noise ratio (SNR) of the selected tone. The method also may include determining a bit loading pattern for the data-bearing signal according to the minimum tone cost. This determination may occur in response to a determination that the transmission of the data-bearing signal is limited by a minimum allowable transmission power for the data-bearing signal. The application of the cost algorithm creates a disjointed spectrum for short and long loops that are in near proximity to one another. In one embodiment, the apparatus includes various modules and other hardware and/or software to perform operations corresponding to the method described herein.

Figure 1:
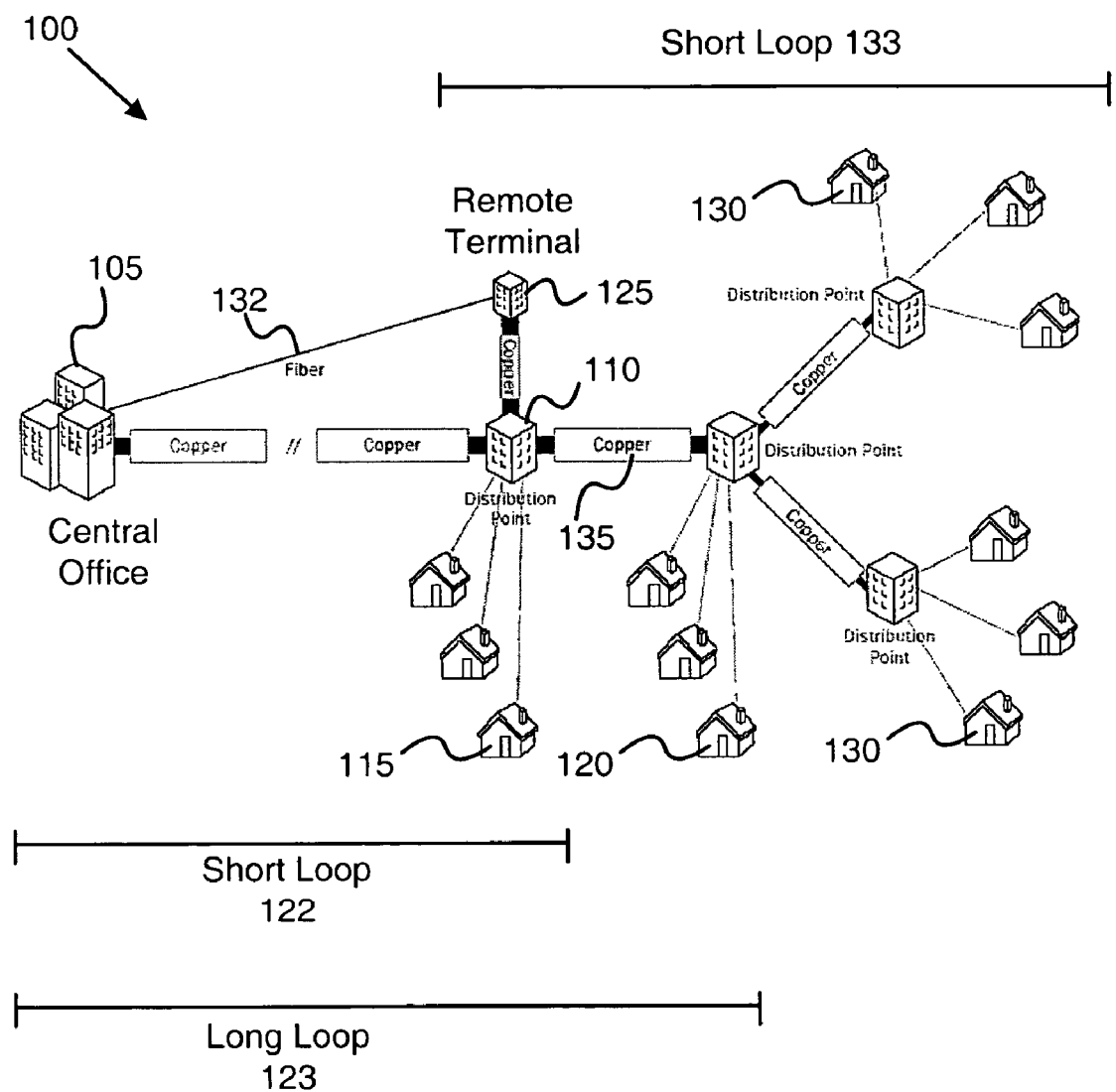
FIG. 1 illustrates a block diagram of one embodiment of a communication system having a plurality of long and short communication loops.

FIG. 1 illustrates a block diagram of one embodiment of a communication system 100. The communication system 100 may be an asynchronous digital subscriber line (ADSL) system that employs a discrete multi-tone (DMT) communication scheme, but is not limited to such a communication system.

The communication system 100 includes a central office 105, multiple distribution points 110 and multiple end users, such as a first end user 115. The central office 105 may contain a first modem that communicates with a second modem at the end user 115. Therefore, reference to the central office 105 and the first end user 115 is understood to refer to the location of the first modem or second modem, respectively. Additionally, the first modem may be referred to as the central office (CO) modem 105 and the second modem may be referred to as the end user (EU) modem 115.

The CO modem 105 may transmit a data-bearing signal to the EU modem 115 via a copper communication medium 118 and the distribution point 110. The distribution point 110 may be a patch panel, for example, or another type of media connection device. The CO modem 105 also may transmit signals to more than one EU modem 115. For example, the CO modem 105 may transmit a second data-bearing signal to a second EU modem 120 that is significantly farther away in distance than the first EU modem 115. Each of these communication paths may be referred to as a communication loop. However, as used herein, the term loop is understood broadly and does not require the presence of a physical communication medium (e.g. copper). Furthermore, the term loop is understood to allow, but not require, the presence of two physical wires or other communication media that form a shape of a loop between a pair of modems or other similar communication devices.

The communication system 100 may include two types of communication loops, namely long communication loops and short communication loops. A long communication loop, or simply long loop, may be characterized by a relatively long physical distance between the transmitting device and the corresponding receiving device. Similarly, a short communication loop, or simply a short loop, may be characterized by a relatively short physical distance between the transmitting device and the corresponding receiving device.

The first communication loop between the CO modem 105 and the first EU modem 115 may be a short loop 122. In one embodiment, the short loop 122 may be made of 24 or 26 gauge copper twisted-pair wire and may be approximately 2,000 to 3,000 feet in length. The second communication loop between the CO modem 105 and the second EU modem 120 may be a long loop 123 (also referred to as a "legacy" loop). In one embodiment, the long loop 123 may be made of 24 or 26 gauge copper twisted-pair wire and may be approximately 15,000 to 18,000 feet in length. The lengths provided herein are given by way of example and the designations of short and long loops may correspond to other ranges that are more broadly or more narrowly arranged.

The communication system 100 also may include a remote terminal 125, additional distribution points 110, and additional end users 130. The remote terminal 125 may contain a third modem, which is referred to herein as a remote terminal (RT) modem 125. In one embodiment, the CO modem 105 communicates a third data-bearing signal to the RT modem 125 over a broadband communication loop 132, such as fiber optic media. The RT modem 125 then may communicate the third data-bearing signal to an EU modem 130 at a third end user 130. The communication loop between the RT modem 125 and the third EU modem 130 may be a short loop 133. The length of the short loop 133 may approximately 2,000 to 3,000 feet or, alternatively, may be less than or greater than 2,000 to 3,000 feet. A significant difference exists in the lengths of a short loop and a long loop to cause cross-talk noise when the two types of loops are in near proximity to each other.

Due to the long distance over which the second data-bearing signal must travel on the long loop 123, the transmission power of the third data-bearing signal on the short loop 133 can cause interference and noise that degrades the quality and/or the bit rate (also referred to as the data transfer rate) of the second signal on the long loop 123. This cross-talk may occur where the long loop 123 and the short loop 133 are either physically located near one another or are disposed in a manner that the signal of one loop may adversely affect the signal of another loop. In the illustrated embodiment, the long loop 123 and the short loop 133 are so disposed within an enclosure of the plurality of communication loops 135 referred to as a "mixed binder" 135 because it includes both long and short loops.

Adaptive-pruning may be implemented on the communication system 100 by an apparatus having a modem, a cost calculation module, and a bit loading module. The modem may transmit a data-bearing signal over a plurality of tones on a communication loop, such as a short loop 133, within a plurality of communication loops 135. The cost calculation module may calculate a minimum tone cost according to a tone cost algorithm. The tone cost algorithm may define a tone cost associated with a selected tone of the plurality of tones based on a predefined loading frequency and a signal-to-noise ratio (SNR) of the selected tone. The bit loading module may determine a bit loading pattern for the data-bearing signal according to the minimum tone cost in response to a determination that a minimum allowable transmission power is greater than a minimum required transmission power for the data-bearing signal.

Figure 2A:
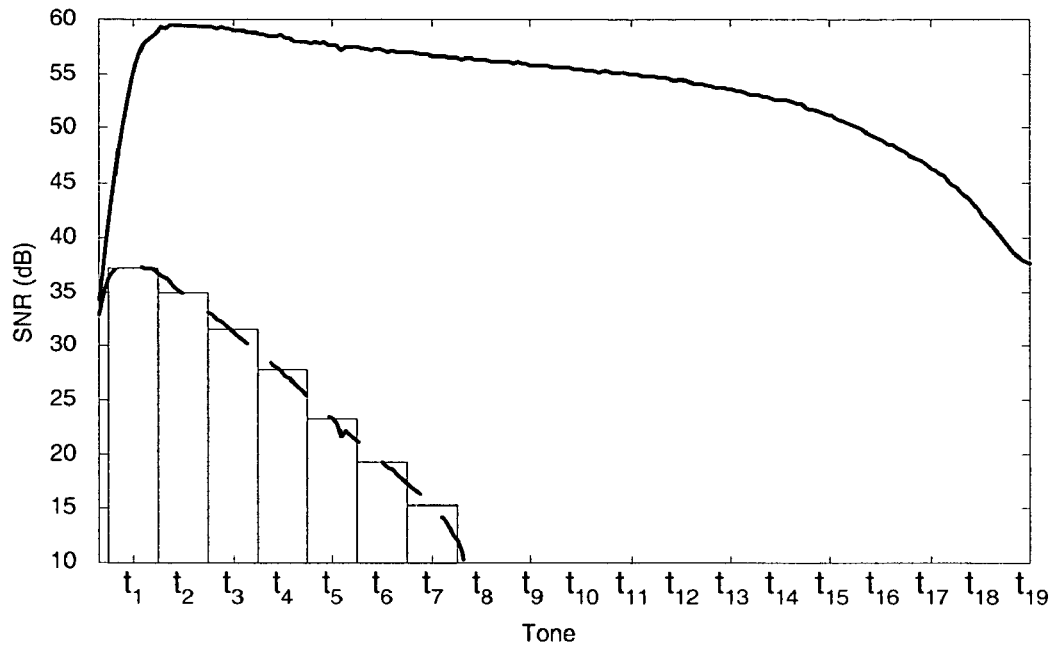
FIG. 2a illustrates a graph of an embodiment of signal-to-noise ratio (SNR) over frequency on a long communication loop.

FIG. 2a illustrates a graph of an embodiment of SNR values (shown dashed) over a plurality of tones on a long communication loop, such as the long loop 123 of FIG. 1. The graph data shows example SNR values for the frequencies within each tone $t_1$ through $t_{19}$ at a location within the mixed binder 135. Each tone, $t_1$ through $t_{19}$, represents one or more frequencies (i.e., channels) within an allowable frequency spectrum. In one embodiment, the allowable frequency spectrum includes the frequencies established and regulated by the Federal Communications Commission (FCC) for DSL communications.

The graph depicts an SNR value for each tone $t_1$ through $t_7$ that has a positive SNR value. Approximate logarithmic values for these tones $t_1$ through $t_7$ are provided in the table presented in FIG. 4a. The absence of SNR values for the remaining tones $t_8$ through $t_{19}$ may be a result of a low transmission signal power, high interference noise, or a combination thereof. In the case of low transmission power, the level of power may be due at least in part to the long distance through which the transmission signal is propagated on the long loop 123. Because the lower tones $t_1$ through $t_7$ correspond to lower frequencies, it can be seen that the lower tones and frequencies are better for transmitting a data-bearing signal over a long loop 123. In certain embodiments, the lower tones and frequencies may be the segment of tones and frequencies available for transmitting a data-bearing signal on a long loop 123.

Figure 2B:
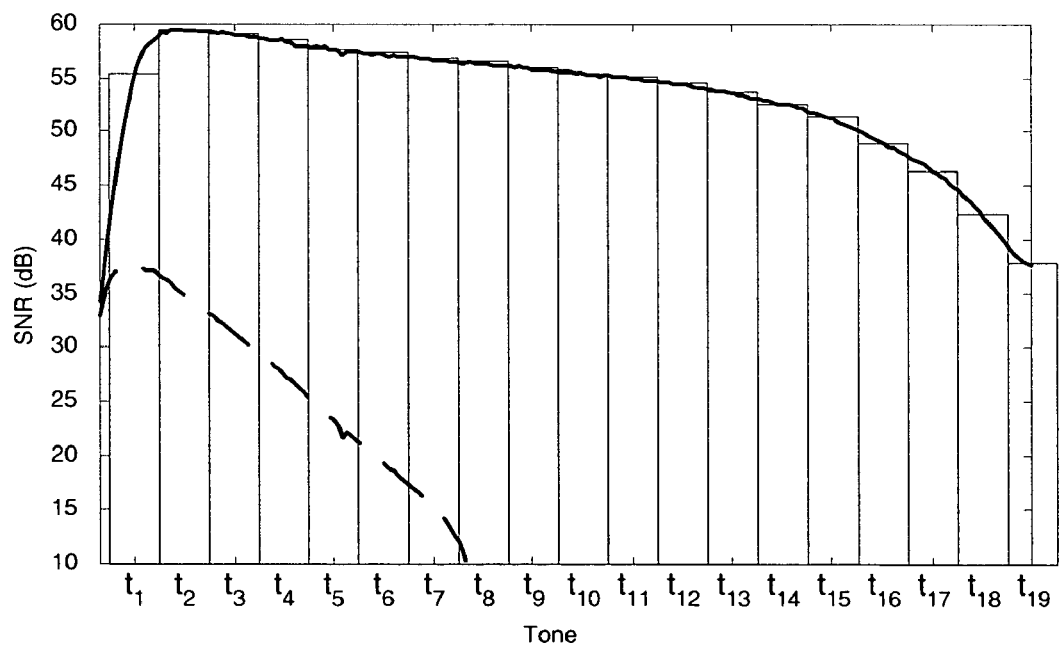
FIG. 2b illustrates a graph of an embodiment of signal-to-noise ratio (SNR) over frequency on a short communication loop.

FIG. 2b illustrates a graph of an embodiment of SNR values (shown solid) over a plurality of tones on a short communication loop, such as the short loop 133 of FIG. 1. The graph data are corollary to the graph data of FIG. 2a and show example SNR values for each tone $t_1$ through $t_{19}$ at the same location within the mixed binder 135. The SNR values for a transmission signal on the short loop 133 are significantly higher than the SNR values for a transmission signal on the long loop 123. As described above, the SNR values corresponding to the long loop 123 may be lower for various reasons, including loss of transmission power over the long distance, interference and noise introduced on the long loop 123, cross-talk due to the data-bearing signal on the short loop 133, and so forth.

Figure 3A:
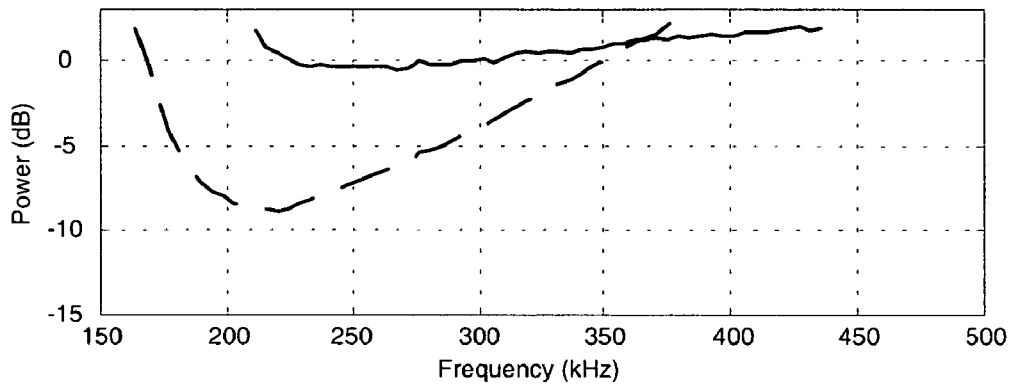
FIG. 3a illustrates a graph of an embodiment of transmission power over frequency on long and short communication loops.

FIG. 3a illustrates a graph of an embodiment of transmission power over a plurality of representative frequencies on a long communication loop (shown dashed) and a short communication loop (shown solid), such as the long loop 123 and the short loop 133, respectively. The graph depicts transmission power values for the short loop 133 that are higher than the transmission power values for the long loop 123. This may occur, for example, when the RT modem 125 is allowed to operate at a maximum power. As a result, a typical short-loop customer may have 30 dB or more of downstream noise margin. Additionally, the substantial transmission power on the short loop 133 may introduce unnecessary cross-talk noise on the long loop 123.

Figure 3B:
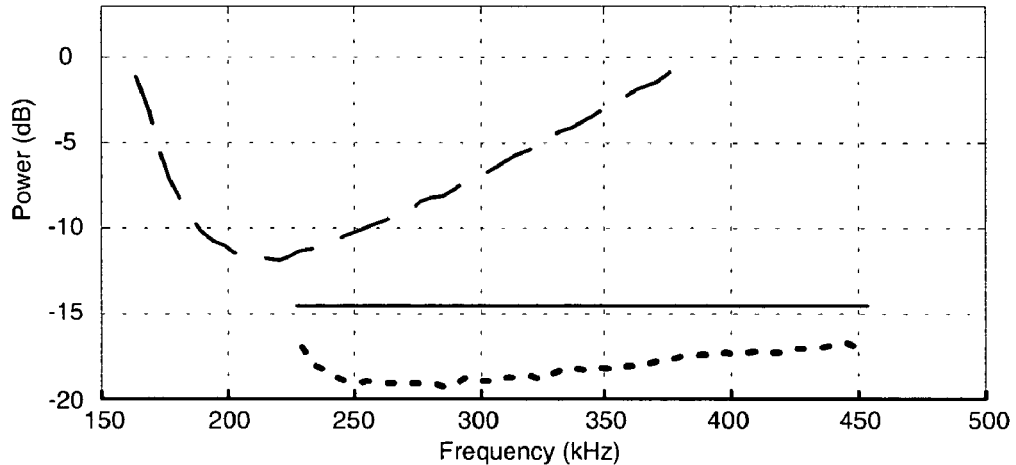
FIG. 3b illustrates a graph of another embodiment of transmission power over frequency on long and short communication loops.

FIG. 3b illustrates a graph of another embodiment of transmission power over a plurality of representative frequencies on a long communication loop (shown dashed) and a short communication loop (shown solid), such as the long loop 123 and the short loop 133, respectively. This graph is similar to the graph of FIG. 3a, except that maximum downstream noise margin and maximum transmission power reduction requirements are imposed. The maximum downstream noise margin may be 10-20 dB. Furthermore, the maximum transmission power reduction may be approximately 15 dB. In one embodiment, the maximum transmission power reduction is determined by an industry standard (e.g., the G.DMT standard) and establishes a minimum allowable transmission power for each tone of −14.5 dB.

These parameters may conflict because the transmission power should be reduced to satisfy the noise margin requirement, but doing so might require excessive power reduction in violation of the maximum transmission power reduction requirement. Even transmitting at a minimum allowable transmission power, according to the maximum transmission power reduction requirement, may introduce cross-talk noise on the long loop 123 due to the strength of the signal on the short loop 133.

Additionally, the minimum allowable transmission power may be greater than a required minimum transmission power (shown dotted). As used herein, the required minimum transmission power is understood to be the minimum transmission power required to produce a receivable data-bearing signal at a receiver, for example.

Figure 3C:
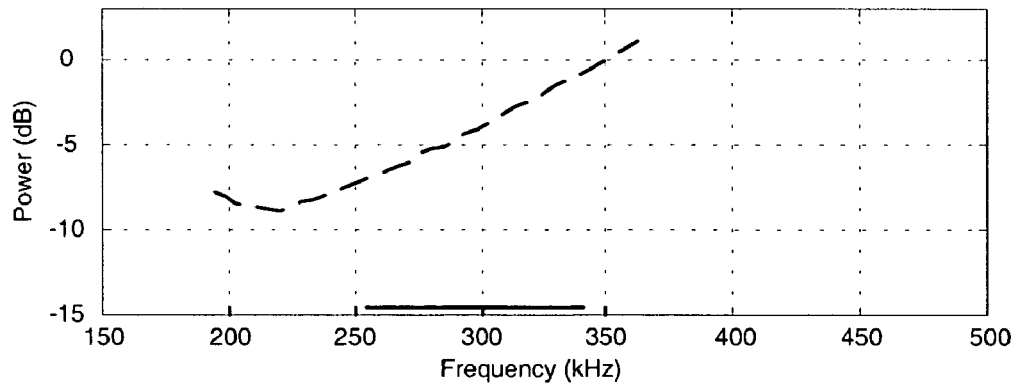
FIG. 3c illustrates graph of another embodiment of transmission power over frequency on long and short communication loops.

FIG. 3c illustrates a graph of another embodiment of transmission power over a plurality of representative frequencies on a long communication loop (shown dashed) and a short communication loop (shown solid), such as the long loop 123 and the short loop 133, respectively. This graph is similar to the graph in FIG. 3b, except that conventional SNR-pruning is imposed on the short RT loop 133 to deactivate tones that have relatively low SNR values. Referring back to FIG. 2b, the upper tones, starting with tone $t_{19}$ and decreasing in frequency, generally have the lowest SNR values. Under an SNR-pruning scheme, the upper tones may be deactivated and the remaining tones may be more heavily loaded in order to reduce power further and adhere to the maximum noise margin requirement. However, while tone deactivation under conventional SNR-pruning reduces the aggregate power, it may not necessarily reduce cross-talk on the long loop 123. The cross-talk still may be non-zero because cross-talk is tone specific and there remains a frequency overlap in the downstream spectrum. Frequency overlap refers to the concurrent transmission on the same tones of signals on both a short loop 133 and a long loop 123.

FIG. 4a illustrates a table of an embodiment of tone costs using conventional SNR-pruning on long and short communication loops, such as the long loop 123 and the short loop 133. In order to determine which tones might be used to transmit a data bearing signal on a communication loop, a transmitting or receiving modem may assign a cost to each tone and deactivate one or more tones having the highest associated cost.

The costs shown in FIG. 4a for each tone $t_1$ through $t_7$ on the long CO loop 123 and each tone $t_1$ through $t_{19}$ on the short RT loop 133 are calculated using the following conventional SNR-pruning cost algorithm:

$$\text{Cost}(t) = \frac{1}{SNR(t)},$$

where t is the selected tone within the available frequency spectrum and SNR(t) is the signal-to-noise ratio (SNR) of the selected tone. The SNR variable may be expressed as either a logarithmic or a linear value. This cost algorithm also may be known as an inverse SNR cost algorithm. For example, the cost associated with tone $t_3$ on a long loop 123 is as follows:

$$\text{Cost}(t_3) = \frac{1}{SNR(t_3)} = \frac{1}{10^{(32/10)}} = 631 \times 10^{-6}.$$

Similarly, the cost associated with tone $t_3$ on a short loop 133 is as follows:

$$\text{Cost}(t_3) = \frac{1}{SNR(t_3)} = \frac{1}{10^{(59/10)}} = 1.26 \times 10^{-6}.$$

The SNR values for $t_3$ are expressed as linear values, where the corresponding approximate logarithmic values are taken from the graphs in FIGS. 2a and 2b, respectively. Because the SNR value for a transmitted signal is usually greater at lower frequencies, the tones having the lowest associated costs are predictably lower frequencies, rather than higher frequencies, for both the long loop 123 and the short loop 133. Hence, this cost algorithm and similar cost algorithms are used to employ a SNR-pruning tone deactivation scheme in which the upper tones are deactivated first because of their lower associated SNR values. By employing this cost algorithm for both the long loop 123 and the short loop 133, the CO modem 105 and RT modem 125 both may transmit using overlapping tones.

FIG. 4b illustrates a table of downstream bit rates on a long communication loop, such as the long loop 123, in the presence of a short communication loop, such as the short loop 133, using a conventional SNR-pruning scheme. In the absence of any short loops 133, the bit rate is relatively high (e.g. 3808 kbps on a long loop 123 that is 12,000 feet in length).

However, with the activation of even a single short loop 133, the bit rate falls drastically (e.g. 1056 kbps on the same long loop 123, which represents over 70% loss). In one embodiment, the percentage loss may be determined by a percentage loss algorithm as follows:

$$\text{Loss} = 1 - \frac{Rate_1}{Rate_0},$$

where $Rate_0$ is a bit rate of the second communication loop in the absence of a noise-producing signal on the first communication loop and $Rate_1$ is a bit rate of the second communication loop in the presence of a noise-producing signal on the first communication loop.

Additionally, the percentage loss in the bit rate increases as the distance of the long loop 123 increases. For example, the long loop 123 has a bit rate of zero as the length of the long loop 123 increases to 17,000 feet and above. The degrading cross-talk effects are more pronounced in the presence of as many as 24 short loops 133 (e.g. 448 kbps on a long loop 123 that is 12,000 feet in length, which represents almost 90% loss). With 24 short loops 133, the bit rate on the long loop 123 is zero as the length of the long loop 123 increases to 15,000 feet and above.

Figure 5:
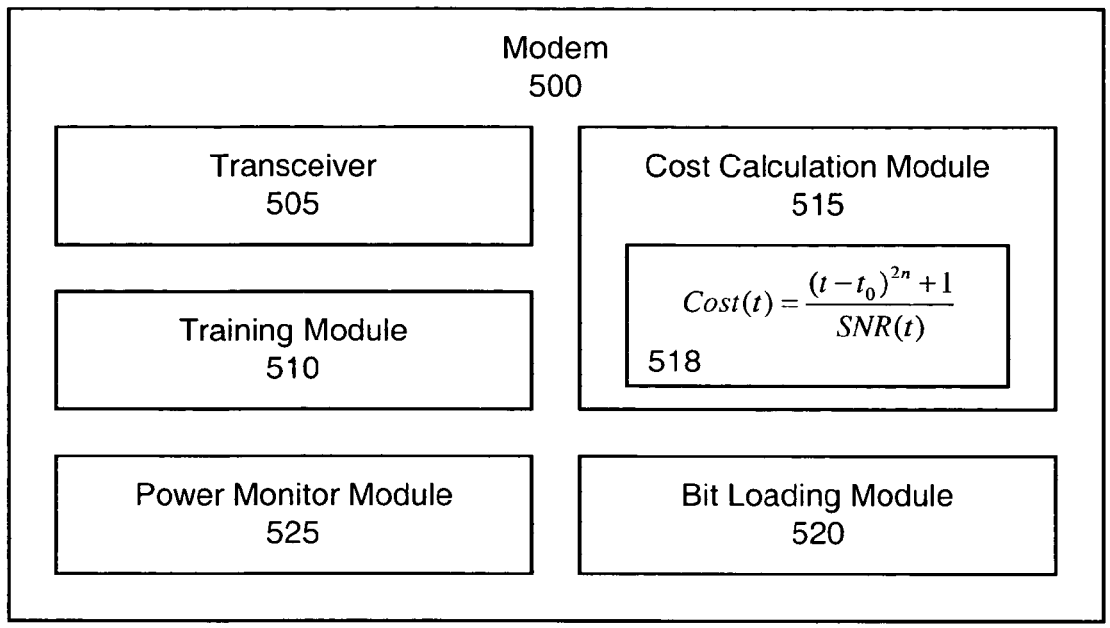
FIG. 5 illustrates a schematic block diagram of one embodiment of a modem.

FIG. 5 illustrates a schematic block diagram of one embodiment of a modem 500 that may be used to implement an adaptive tone-pruning deactivation scheme. In one embodiment, the modem 500 may be a CO modem 105, an RT modem 125, an end user modem 115, and so forth.

The depicted modem 500 includes a transceiver 505, a training module 510, a cost calculation module 515, a power monitor module 525, and a bit loading module 520. One example of possible operations that may be performed and functionality that may be achieved by the modem 500 and its corresponding modules is provided in more detail with reference to FIG. 8. The transceiver 505 transmits and receives a data-bearing signal across a communication loop.

In one embodiment, the training module 510 implements a protocol training scheme on the modem 500 to establish certain parameters for communicating with another modem. The training module 510 may transmit a known training signal (having a known transmission power) during a training period. The training module 510 also may receive a training signal from a corresponding transmitting modem and determine an SNR value for the known training signal.

The training module 510 also may invoke the power monitor module 525 to determine a minimum required transmission level and/or a minimum allowable transmission level. The training module 510 also may invoke the cost calculation module 515 to calculate a tone cost for each of one or more tones. Additionally, the training module 510 may invoke the bit loading module 520 to determine a bit loading pattern. The training module 510 also may communicate the bit loading pattern to a corresponding transmitting or receiving modem.

In one embodiment, the cost calculation module 515 calculates a tone cost associated with a selected tone within an allowable frequency spectrum. For example, the cost calculation module 515 may calculate a tone cost using the following adaptive-pruning tone cost algorithm:

$$\text{Cost}(t) = \frac{(t-t_0)^{2n} + 1}{SNR(t)},$$

where t is a selected tone within the plurality of tones, $t_0$ is a predefined loading frequency, n is a positive number determinative of a relative weight, and SNR(t) is a function descriptive of the signal-to-noise ratio (SNR) of the selected tone. The tones t and $t_0$ may be expressed as a tone number, such as between 0 and 255. Alternatively, the tones t and $t_0$ may be expressed as frequencies.

In another embodiment, the cost calculation module 515 may calculate a first tone cost for a first selected tone using the inverse SNR cost algorithm and a second tone cost for a second selected tone using an adaptive-pruning tone cost algorithm. Furthermore, the cost calculation module 515 may use an inverse SNR cost algorithm or an adaptive-pruning cost algorithm depending on a signal at the modem that identifies the communication loop as a long loop 123 or a short loop 133, for example.

In one embodiment, the power monitor module 525 monitors the transmission power of the modem 500. The power monitor module 525 also may determine a minimum required power that is the minimum transmission power required to reliably transfer data to another modem at a given bit rate or data transfer rate. Additionally, the power monitor module 525 may determine if the minimum allowable transmission power (e.g. an industry standard minimum of -14.5 dB) is greater than the minimum required transmission power for the data-bearing signal.

In one embodiment, the bit loading module 520 determines a bit loading pattern that may be used to transmit a data-bearing signal on a communication loop, such as the short loop 133. For example, the bit loading module 520 may determine the bit loading pattern according to a minimum tone cost that is calculated by the cost calculation module 515. Additionally, the bit loading module 520 may determine the bit loading pattern in response to a determination based on the minimum allowable transmission power being greater than the minimum required transmission power for the data-bearing signal.

Figure 6:
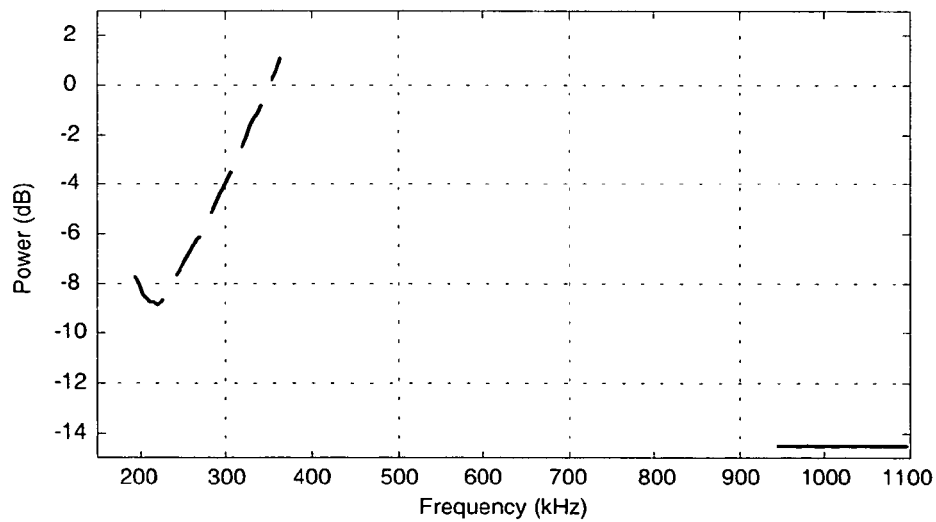
FIG. 6 illustrates a graph of an embodiment of transmission power over frequency on long and short communication loops using adaptive-pruning.

FIG. 6 illustrates a graph of an embodiment of transmission power over a plurality of representative frequencies on long and short communication loops, such as the long loop 123 and the short loop 133, using adaptive tone-pruning. Specifically, the graph depicts example transmission power on a long loop 123 (shown dashed) that uses a top-pruning scheme and on a short loop 133 (shown solid) that uses bottom-pruning scheme.

Top-pruning refers to a tone deactivation scheme that deactivates tones from the top to the bottom of the frequency spectrum. Bottom-pruning refers to a tone deactivation scheme that deactivates tones from the bottom to the top of the frequency spectrum. The adaptive-pruning cost algorithm 518 automatically implements both top-pruning on the long loop 123 and bottom-pruning on the short loop 133 within a mixed binder 135 because of the relative size of the SNR factor and predefined loading frequency in each scenario. Furthermore, the adaptive-pruning algorithm 518 may be implemented to calculate tone costs independent of any knowledge of loop lengths. In this way, adaptive-pruning may provide non-overlapping downstream bands for short and long loop costumers.

In one embodiment, short loop customers with very high values of downstream noise margin may use the higher frequency tones to transmit data, reserving the lower tones for the long loop customers who would otherwise be unable to achieve reasonable downstream rates. Using pruning from the bottom on the short loop 133, the transmission power level necessary for the transmission signal on the short loop 133 may be higher than the minimum required transmission power, but may still be lower than the minimum allowable transmission power. Using more than the minimum required transmission power may generate relatively higher levels of cross-talk on the upper tones used for the short loop 133, but this cross-talk has little or no impact on the signals transmitted on the lower tones on a corresponding long loop 123.

The graph shows how an adaptive-pruning scheme, using top-pruning on the long loop 123 and bottom-pruning on the short loop 133, results in disjointed downstream frequency bands for the long loop 123 and the short loop 133. In fact, adaptive-pruning potentially eliminates all cross-talk noise from the short loop 133 to the long loop 123. The value of an adaptive-pruning scheme may be more pronounced when the overall downstream bandwidth of available frequencies is wider. With a wider bandwidth there may be more flexibility in positioning the downstream tones for the short loop 133 and the long loop 123 in disjointed bands. Specifically, the ADSL2+ standard, which is an extension to the ADSL standard where the total overall downstream bandwidth is twice as wide, can significantly benefit from adaptive-pruning tone deactivation implementations.

FIG. 7a illustrates a table of one embodiment of tone costs using adaptive-pruning on long and short communication loops, such as the long loop 123 and the short loop 133. The tones that are shown in the table are representative, and not limiting, of the tones that may be available within a frequency spectrum. In certain embodiments, the tone costs may be assigned by the CO modem 105, the RT modem 125, the EU modem 115, 120, 130, or another multi-carrier communication device.

The tone costs for each tone $t_1$ through $t_7$ on the long loop 123 and for each tone $t_1$ through $t_{19}$ on the short loop 133 may be calculated using the adaptive-pruning cost algorithm 518. For example, the cost associated with tone $t_3$ on the long loop 123 is as follows:

$$\text{Cost}(t_3) = \frac{(t_3 - t_0)^{2n} + 1}{SNR(t_3)} = \frac{(3-19)^{2(1)} + 1}{10^{(32/10)}} = 1615 \times 10^{-4},$$

where t is 3, $t_0$ is the highest tone, 19, n is 1, and SNR(t) is the linear value of the SNR for tone $t_3$. The logarithmic SNR value for $t_3$ is taken from the graph in FIG. 2b. Similarly, the cost associated with tone $t_{15}$ on the long loop 123 is as follows:

$$\text{Cost}(t_3) = \frac{(t_3 - t_0)^{2n} + 1}{SNR(t_3)} = \frac{(15-19)^{2(1)} + 1}{10^{(0/10)}} = 160001 \times 10^{-4}.$$

These calculations show that lower tones have a lower cost because of the high SNR values for the higher tones. Although tone $t_{19}$ shows a low tone cost of 1.00, the bit loading module may discard this calculation since the SNR is zero or, alternatively, because it is the same tone as the predefined loading frequency $t_0$.

The tone cost associated with tone $t_3$ on the short loop 133 is as follows:

$$\text{Cost}(t_3) = \frac{(t_3 - t_0)^{2n} + 1}{SNR(t_3)} = \frac{(3-19)^{2(1)} + 1}{10^{(59/10)}} = 3.22 \times 10^{-4},$$

where the logarithmic SNR value for $t_3$ is taken from the graph in FIG. 2b. Compare this to the cost associated with tone $t_{15}$ on the short loop 133, which is as follows:

$$\text{Cost}(t_{15}) = \frac{(t_{15} - t_0)^{2n} + 1}{SNR(t_{15})} = \frac{(15-19)^{2(1)} + 1}{10^{(51/10)}} = 1.27 \times 10^{-4}.$$

Because the cost for tones on the short loop 133 are dependent on the SNR value as well as a predefined loading frequency, the adaptive-pruning cost algorithm 518 can be adjustable based on the predefined loading frequency. In general, a selected tone that is farther from the predefined loaded frequency will have a higher cost than a closer tone, assuming the SNR values for both tones are the same. Therefore, minimizing the adaptive-pruning cost function 518 with the predefined loaded frequency $t_o$ set to the highest tone results predominantly in tone-pruning from the bottom where SNR values are relatively unchanging. Additionally, using a large value for n makes the adaptive-pruning cost function 518 relatively insensitive to the SNR value of the selected tone.

By employing adaptive pruning, top-pruning on the long loop 123 and bottom-pruning on the short loop 133, the CO modem 105 and RT modem 125 may transmit signals within a mixed binder 135 using non-overlapping tones. For example, the CO modem 105 may use tones $t_1$ through $t_5$ to transmit a first data-bearing signal and the RT modem 125 may use tones $t_{14}$ through $t_{18}$, which have the lowest associated costs (except for tone $t_{19}$), to transmit a second data-bearing signal. Cross-talk noise probably will not result on the long loop 123 regardless of the transmission power on the short loop 133. Thus, in one embodiment, no interference or noise will degrade the data transfer rate on the long loop 123.

FIG. 7b illustrates a table of one embodiment of downstream bit rates on a long communication loop, such as the long loop 123, in the presence of a short communication loop, such as the short loop 133, using an adaptive-pruning scheme. In the absence of any short loops 133, the bit rate is relatively high (e.g. 3808 kbps on a long loop 123 that is 12,000 feet in length).

With the activation of a single short loop 133, the bit rate on the long loop 123 changes less than 20% (e.g. 3136 kbps on the same long loop 123). In fact, the bit rate may remain unchanged on long loops 123 of other lengths of 15,000 feet or more. The change in bit rate is still satisfactory (approximately 21%) in the presence of as many as 24 short loops 133 (e.g. 3008 kbps on a long loop 123 that is 12,000 feet in length). The percentage change decreases as the length of the long loop 123 increases. For example, the change in bit rate on a long loop 123 of 14,000 feet or more is appreciably less than 10% even with 24 short loops 133.

Figure 8:
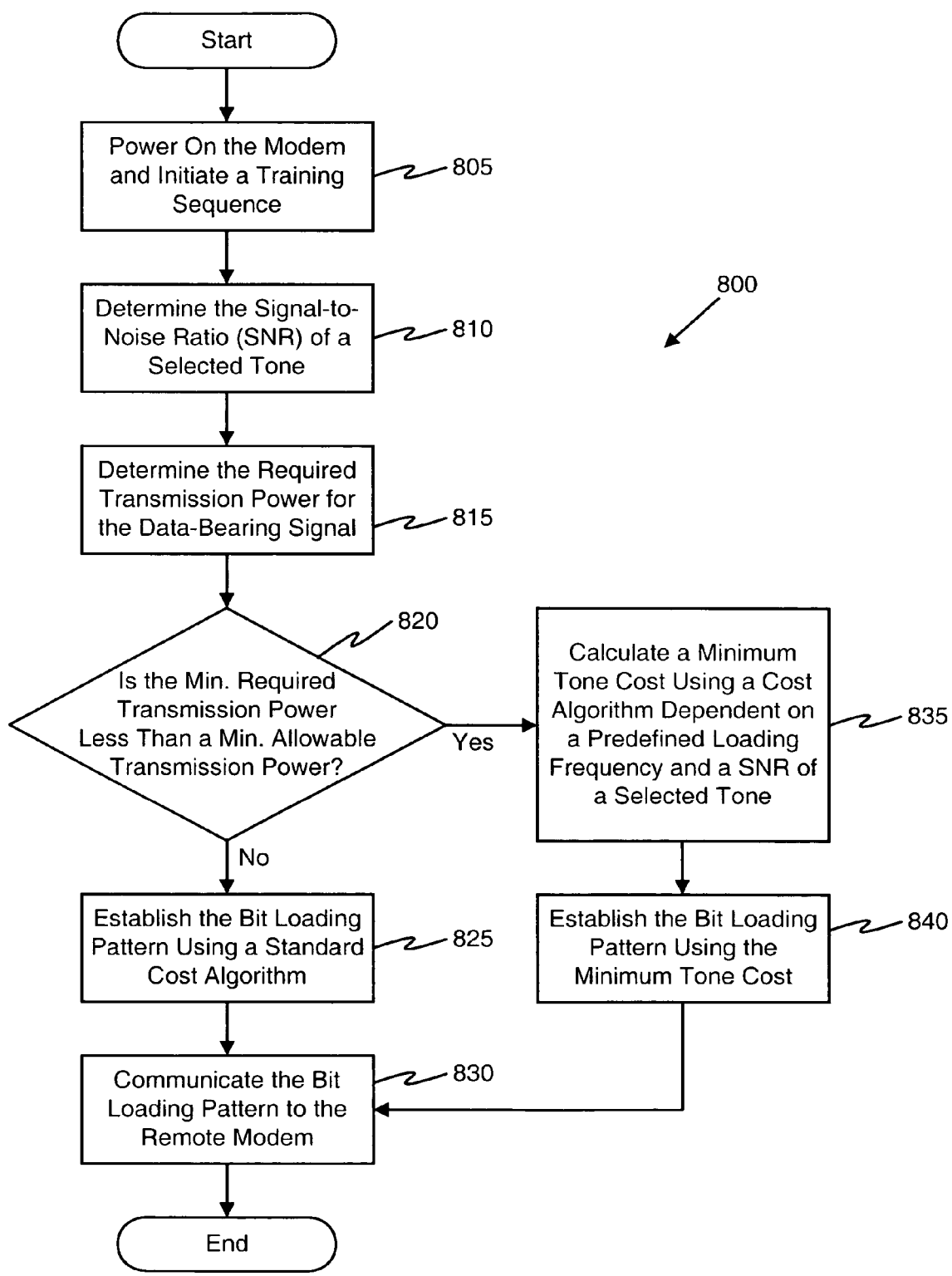
FIG. 8 illustrates a flow chart of one embodiment of an adaptive-pruning method.

FIG. 8 illustrates a flow chart of one embodiment of an adaptive-pruning method 800 that may be implemented in conjunction with the modem 500 or an equivalent multi-carrier communication device. For clarity, the following discussion of the example adaptive-pruning method 800 is described with reference to an EU modem 130 that is connected to a short RT loop 133. The EU modem 130 may be substantially similar to the modem 500 described above. Reference will also be made to a second modem that is representative of an RT modem 125. The RT modem 125 may be substantially similar to the modem 500, also.

The illustrated adaptive-pruning method 800 begins when the EU modem 130 is powered on, block 805. At the time of being powered on, the EU modem 130 initiates a training sequence in the protocol in conjunction with the RT modem 125. In one embodiment, the training module 510 may initiate the training sequence and manage the operations thereof. For example, the EU modem 130 may send an initiation signal to the RT modem 125 via the transceiver 505 over the short loop 133. For ease of discussion, all of the communications described herein between the EU modem 130 and the RT modem 125 are assumed to occur via the short loop 133 and respective transceivers 505 on the EU modem 130 and RT modem 125.

In response to the initiation signal from the EU modem 130, the RT modem 125 may send a known training communication to the EU modem 130. In one embodiment, the training communication includes a transmission signal over each tone within a specified spectrum, where each transmission signal has a known transmission power. Upon receiving the training communication from the RT modem 125, the EU modem 130 may invoke the power monitor module 525 to determine the received power and SNR value for each tone within the training communication, block 810.

The power monitor module 525 then determines the minimum required transmission power for a data-bearing signal on a selected tone, block 815. Additionally, the power monitor module 525 may determine if the minimum required transmission power is less than the minimum allowable transmission power for a data-bearing signal on the short loop 133, block 820. Alternatively, the power monitor module 525 may determine if the minimum allowable transmission power is less than or greater than the minimum required transmission power.

If the minimum required transmission power is less than the minimum allowable transmission power, the cost calculation module 515 determines a minimum tone cost using a cost algorithm that is dependent on a predefined loading frequency to and the SNR of a selected frequency t, block 835. In one embodiment, the cost calculation module 815 employs the adaptive-pruning cost algorithm 518 to determine the minimum tone cost. The bit loading module 520 then proceeds to determine a bit loading pattern according to the minimum tone cost, block 840. After the bit loading module 520 determines the bit loading pattern, the EU modem 130 proceeds to communicate the adaptive-pruning bit loading pattern to the RT modem 125 for future transmissions, block 830.

In one embodiment, if the minimum required transmission power is not less than the minimum allowable transmission power, the cost calculation module 515 and the bit loading module 520 proceed to determine a bit loading pattern according to a standard cost algorithm, such as the inverse SNR cost algorithm described above, block 825. As stated above, determining a bit loading pattern according to the inverse SNR cost algorithm, for example, results in a conventional SNR-pruning scheme that likely will not sufficiently reduce the cross-talk noise on a long CO loop 123. The EU modem 130 then communicates the standard bit loading pattern to the RT modem 125 for future transmissions, block 830. The illustrated adaptive-pruning method 800 then ends.

FIG. 9a illustrates a graph of a top-pruning implementation over a number of tones. In one embodiment, the tone identifiers (e.g. 33, 128, and 256) correspond to frequencies or frequency bands that increase as the tone identifiers increase. Using a top-pruning scheme, the uppermost tones are deactivated first and further tones are deactivated as the tone identifiers (and corresponding frequencies) decrease.

FIG. 9b illustrates a graph of bottom-pruning over a number of tones. Once again, the tone identifiers (e.g. 33, 128, and 256) correspond to frequencies or frequency bands that increase as the tone identifiers increase. Using a bottom-pruning scheme, however, the lowermost tones may be deactivated first and further tones are deactivated as the tone identifiers (and corresponding frequencies) increase. In one embodiment, if a communication loop is identified as a short loop 133, then a bottom-pruning scheme may be applied to that short loop 133. In another embodiment, the uppermost and lowermost tones may be deactivated first and further tones may be deactivated in both direction toward the predefined loading frequency $t_0$ or corresponding tone.

FIG. 10a illustrates one embodiment of a percentage loss algorithm 1000. In one embodiment, the depicted percentage loss algorithm 1000 may be used to determine a percentage loss of the bit rate of a long loop 123 in the presence of a transmission signal on a short loop 133 within the same plurality of communication loops 135. In one embodiment, the modem 500 may use the percentage loss algorithm 1000 to determine the percentage loss of the bit rate.

FIG. 10b illustrates an alternative embodiment of the adaptive-pruning cost algorithm 518. The depicted alternative adaptive-pruning cost algorithm 518 is independent of the SNR value of the selected tone and, therefore, may be used to determine a minimum tone cost that is merely dependent on the predefined loading frequency. In one embodiment, the cost calculation module 515 may employ the alternative adaptive-pruning cost algorithm to determine the minimum tone cost associated with a selected ton.

Advantageously, an adaptive-pruning tone scheme may be integrated with current generation ADSL modems. Additionally, adaptive tone-pruning schemes may be achieved without extensive engineering or capital investment.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

For example, a machine-readable medium may be provided having one or more instructions stored thereon, which instructions may be used to program a computer system or other electronic device to perform the operations described. A machine-readable medium may include any mechanism for storing or transmitting information in a form (e.g., software or processing application) readable by a machine (e.g., a computer). The machine-readable medium may include, but is not limited to, magnetic storage media (e.g., a floppy diskette), optical storage media (e.g., CD-ROM, CD-RW, DVD, etc.), magneto-optical storage media, read only memory (ROM), random access memory (RAM), erasable programmable memory (e.g., EPROM and EEPROM), flash memory, or other types of media suitable for storing electronic instructions.

The instructions and operations also may be practiced in distributed computing environments where the machine-readable media is stored on and/or executed by more than one computer system. In addition, the information transferred between computer systems may either be pulled or pushed across the communication media connecting the computer systems.

In general, although exemplary frequencies and tones are used in the description above, other frequencies, tones, and combinations thereof may be applicable to or affected by certain embodiments of the present invention.

Furthermore, referring to FIG. 1, although the communication system 100 is described above in the context of an ADSL system, the communication system 100 is representative of alternative types of communication systems, such as wireless radio frequency (RF), that may employ multi-carrier communication schemes to communicate data from a transmitter to a receiver. Similarly, although the current description describes the CO modem 105 and EU modem 115 as DSL modems, the CO modem 105 and EU modem 115 are representative, but not limiting, of any type of communication device that is capable of transmitting and/or receiving multi-carrier communications.

Referring to FIG. 2, although merely nineteen tones are shown herein, alternative embodiments may include more or less tones within an allowable frequency spectrum. For example, in another embodiment, the allowable frequency spectrum may be subdivided into 256 tones.

Referring back to FIGS. 4a and 7a, the RT modem 125 or an EU modem 115, 120, 130 may assign the tone costs, rather than the CO modem 105.

Referring back to FIG. 5, the modem 500 may be an RT modem 125 in an alternative embodiment. In another embodiment, the modem 500 may be an EU modem 115, 120, 130. In another embodiment, the modem 500 may be a DSL modem or any other digital transmission device, including a wireless access point, that employs multi-carrier communications. In addition to the depicted modules, the modem 500 also may include other modules, hardware, firmware, software, and so forth, that are typical in a multi-carrier communication device.

With further reference to FIG. 5, the transceiver 505 may include, for example, a physical interface to connect to a physical communication loop, such as 26 gauge twisted pair copper wire. Alternatively, the transceiver 505 may include one or more antennas to transmit and receive wireless communications, such as in a wireless local area network (WLAN).

Referring to FIG. 6a, the values for the selected tone, predefined loading frequency, and SNR may be expressed in alternate terms. For example, the selected tone t and the loading frequency $t_0$ may be expressed as frequency, such as a center frequency of a tone. Additionally, the SNR value may be expressed in an alternative manner, such as the logarithmic value rather than the linear value. In that case, the cost associated with tone $t_3$ on the short loop 133 may be as follows:

$$\text{Cost}(t_3) = \frac{(t_3 - t_0)^{2n} + 1}{SNR(t_3)} = \frac{(0.3 - 1.1)^{2(1)} + 1}{59} = 1.69 \times 10^{-2},$$

where t is 0.3 GHz (300 kHz), $t_0$ is 1.1 GHz (1100 kHz), n is 1, and the logarithmic SNR value for $t_3$ is taken from the graph in FIG. 2b. Compare this to the cost associated with tone $t_{15}$ on the short loop 133 using the same units for the tones and SNR value, which is as follows:

$$\text{Cost}(t_{15}) = \frac{(t_{15} - t_0)^{2n} + 1}{SNR(t_{15})} = \frac{(0.9 + 1.1)^{2(1)} + 1}{51} = 1.96 \times 10^{-2}.$$

Using tone frequencies rather than tone identifiers illustrates that the difference in tone costs can be magnified depending on the values and units used to represent the selected tone t and the loading frequency $t_0$.

In a further embodiment, other variations and combinations of the adaptive-pruning techniques described herein may be employed. For example, an adaptive-pruning scheme may be implemented on the short loop 133 while a conventional SNR-pruning scheme may be implemented on the long loop 123.

Referring to FIG. 8, although the adaptive-pruning method 800 is shown in the form of a flow chart having separate block and arrows, the operations described in a single block do not necessarily constitute a process or function that is dependent on or independent of the other operations described in other blocks. Furthermore, the order in which the operations are described herein is merely illustrative, and not limiting, as to the order in which such operations may occur in alternate embodiments. For example, some of the operations described may occur in series, in parallel, or in an alternating and/or iterative manner.

What is claimed is:

1. An apparatus, comprising:
   a modem configured to transmit a data-bearing signal over a plurality of tones on a communication loop within a plurality of communication loops;
   a cost calculation module configured to calculate a minimum tone cost according to a tone cost algorithm, the tone cost algorithm defining a tone cost associated with a selected tone of the plurality of tones based on a predefined loading frequency and a signal-to-noise ratio (SNR) of the selected tone; and
   a bit loading module configured to determine a bit loading pattern for the data-bearing signal according to the minimum tone cost in response to a determination that a minimum allowable transmission power is greater than a minimum required transmission power for the data-bearing signal.

2. The apparatus of claim 1, wherein the tone cost algorithm is as follows:

$$\text{Cost}(t) = \frac{(t - t_0)^{2n} + 1}{SNR(t)},$$

where t comprises the selected tone within the plurality of tones, $t_0$ comprises the predefined loading frequency, n comprises a positive number determinative of a relative weight, and SNR(t) comprises a function descriptive of the signal-to-noise ratio (SNR) of the selected tone.

3. The apparatus of claim 2, further comprising a training module configured to facilitate a training communication between the modem and a second modem to determine the signal-to-noise (SNR) ratio of the selected tone.

4. The apparatus of claim 1, further comprising a power monitor module configured to determine if the minimum allowable transmission power is greater than the minimum required transmission power for the data-bearing signal.

5. The apparatus of claim 1, wherein:
   the communication loop carries the data-bearing signal between the modem located at a remote terminal and a second modem located at an end user location; and
   the predefined loading frequency comprises an upper frequency within an allowable frequency spectrum.

6. The apparatus of claim 5, wherein the predefined loading frequency comprises an uppermost frequency within the allowable frequency spectrum.

7. The apparatus of claim 1, wherein the communication loop is a short loop and the bit loading module is further configured to determine the bit loading pattern to reduce cross-talk noise on a long loop within the plurality of communication loops, the cross-talk noise caused by the data-bearing signal of the short loop on the long loop.

8. The apparatus of claim 1, wherein the bit loading module is further configured to determine the bit loading pattern to eliminate cross-talk noise in the plurality of communication loops in a near proximity to one another, wherein the communication loop comprises a first loop between a remote terminal and a first end user location, the plurality of communication loops further comprising a second loop between a central office and a second end user location.

9. The apparatus of claim 1, wherein the bit loading module is further configured to determine the bit loading pattern to create a disjoint spectrum with a second bit loading pattern of a second data-bearing signal on a second communication loop within the plurality of communication loops.

10. The apparatus of claim 1, wherein the modem comprises a digital subscriber line (DSL) modem.

11. The apparatus of claim 1, wherein the bit loading module is further configured to determine a bottom-pruning bit loading pattern and deactivate a lower frequency within an allowable frequency spectrum for the communication loop, wherein the communication loop comprises a short loop.

12. A system, comprising:
   a first transmitter configured to transmit a first data-bearing signal over a first plurality of tones on a short loop within a plurality of communication loops;
   a second transmitter configured to transmit a second data-bearing signal over a second plurality of tones on a long loop within the plurality of communication loops; and a first bit loading module configured to determine a first bit loading pattern for the first data-bearing signal according to a first minimum tone cost, the first minimum tone cost calculated according to a tone cost algorithm defining a tone cost associated with a selected tone of the first plurality of tones based on a predefined loading frequency and a signal-to-noise ratio (SNR) of the selected tone; and
   a cost calculation module configured to calculate the first minimum tone cost, wherein the tone cost algorithm is as follows:

$$\text{Cost}(t) = \frac{(t - t_0)^{2n} + 1}{SNR(t)},$$

where t comprises the selected tone within the first plurality of tones, to comprises the predefined loading frequency, n comprises a positive number determinative of a relative weight, and SNR(t) comprises a function descriptive of the signal-to-noise ratio (SNR) of the selected tone.

13. A system, comprising:
   a first transmitter configured to transmit a first data-bearing signal over a first plurality of tones on a short loop within a plurality of communication loops;
   a second transmitter configured to transmit a second data-bearing signal over a second plurality of tones on a long loop within the plurality of communication loops; and a first bit loading module configured to determine a first bit loading pattern for the first data-bearing signal according to a first minimum tone cost, the first minimum tone cost calculated according to a tone cost algorithm defining a tone cost associated with a selected tone of the first plurality of tones based on a predefined loading frequency and a signal-to-noise ratio (SNR) of the selected tone; and a power monitor module configured to determine if a minimum allowable transmission power is greater than a minimum required transmission power for the first data-bearing signal and wherein the first bit loading module is further configured to determine the first bit loading pattern in response to a determination that the minimum allowable transmission power is greater than the minimum required transmission power for the first data-bearing signal.

14. A system, comprising:

a first modem configured to transmit a first data-bearing signal over a first plurality of tones over a long loop within a plurality of communication loops, the first plurality of tones selected from an allowable plurality of tones according to a first tone cost algorithm dependent on a signal-to-noise ratio (SNR) of a first selected tone within the first plurality of tones; and a second modem configured to transmit a second data-bearing signal over a second plurality of tones over a short loop within the plurality of communication loops, the second plurality of tones selected from the allowable plurality of tones according to a second tone cost algorithm dependent on a predefined loading frequency and a signal-to-noise ratio (SNR) of a second selected tone within the second plurality of tones, wherein the second tone cost algorithm is as follows:

$$\text{Cost}(t) = \frac{(t - t_0)^{2n} + 1}{SNR(t)},$$

where t comprises the second selected tone, $t_0$ comprises the predefined loading frequency, n comprises a positive number determinative of a relative weight, and SNR(t) comprises a function descriptive of the signal-to-noise ratio (SNR) of the second selected tone.

15. A method, comprising:

transmitting a data-bearing signal over a plurality of tones on a communication loop within a plurality of communication loops;

calculating a minimum tone cost according to a tone cost algorithm, the tone cost algorithm defining a tone cost associated with a selected tone of the plurality of tones based on a predefined loading frequency and a signal-to-noise ratio (SNR) of the selected tone; and determining a bit loading pattern for the data-bearing signal according to the minimum tone cost in response to a determination that a minimum allowable transmission power is greater than a minimum required transmission power for the data-bearing signal.

16. The method of claim 15, wherein the tone cost algorithm is as follows:

$$\text{Cost}(t) = \frac{(t - t_0)^{2n} + 1}{SNR(t)},$$

where t comprises the selected tone within the plurality of tones, $t_0$ comprises the predefined loading frequency, n comprises a positive number determinative of a relative weight, and SNR(t) comprises a function descriptive of the signal-to-noise ratio (SNR) of the selected tone.

17. The method of claim 15, further comprising facilitating a training communication between a modem and a second modem to determine the signal-to-noise (SNR) ratio of the selected tone.

18. The method of claim 15, further comprising reducing cross-talk noise on a long loop within the plurality of communication loops, the cross-talk noise caused by the data-bearing signal on a short loop.

19. The method of claim 18, further comprising eliminating the cross-talk noise on the long loop.

20. The method of claim 15, further comprising creating a disjoint spectrum with a second bit loading pattern of a second data-bearing signal on a second communication loop within the plurality of communication loops.

21. The method of claim 15, further comprising:

transmitting the data-bearing signal between a remote terminal (RT) modem and an end user (EU) modem;

determining a bottom-pruning bit loading pattern; and deactivating a lower frequency within an allowable frequency spectrum.

22. A computer-readable medium storing executable computer instructions to cause a computer to perform operations, comprising:

transmit a data-bearing signal over a plurality of tones on a communication loop within a plurality of communication loops;

calculate a minimum tone cost according to a tone cost algorithm, the tone cost algorithm defining a tone cost associated with a selected tone of the plurality of tones based on a predefined loading frequency and a signal-to-noise ratio (SNR) of the selected tone; and determine a bit loading pattern for the data-bearing signal according to the minimum tone cost in response to a determination that a minimum allowable transmission power is greater than a minimum required transmission power for the data-bearing signal.

23. The computer-readable medium of claim 22, wherein the tone cost algorithm is as follows:

$$\text{Cost}(t) = \frac{(t - t_0)^{2n} + 1}{SNR(t)},$$

where t comprises the selected tone within the plurality of tones, $t_0$ comprises the predefined loading frequency, n comprises a positive number determinative of a relative weight, and SNR(t) comprises a function descriptive of the signal-to-noise ratio (SNR) of the selected tone.

24. The computer-readable medium of claim 22, further comprising executable instructions to cause the computer to reduce cross-talk noise on a long loop within the plurality of communication loops, the cross-talk noise caused by the data-bearing signal on a short loop.

25. The computer-readable medium of claim 24, further comprising executable instructions to cause the computer to eliminate the cross-talk noise on the long loop.

26. The computer-readable medium of claim 22, further comprising executable instructions to cause the computer to create a disjoint spectrum with a second bit loading pattern of a second data-bearing signal on a second communication loop within the plurality of communication loops.

27. An apparatus, comprising:
  means for transmitting a data-bearing signal over a plurality of tones on a communication loop within a plurality of communication loops;
  means for calculating a minimum tone cost according to a tone cost algorithm, the tone cost algorithm defining a tone cost associated with a selected tone of the plurality of tones based on a predefined loading frequency and a signal-to-noise ratio (SNR) of the selected tone; and
  means for determining a bit loading pattern for the data-bearing signal according to the minimum tone cost in response to a determination that a minimum allowable transmission power is greater than a minimum required transmission power for the data-bearing signal.

28. The apparatus of claim 27, wherein the tone cost algorithm is as follows:

$$\text{Cost}(t) = \frac{(t-t_0)^{2n}+1}{SNR(t)},$$

where t comprises the selected tone within the plurality of tones, $t_0$ comprises the predefined loading frequency, n comprises a positive number determinative of a relative weight, and SNR(t) comprises a function descriptive of the signal-to-noise ratio (SNR) of the selected tone.

29. The apparatus of claim 27, further comprising means for reducing cross-talk noise on a long loop within the plurality of communication loops, the cross-talk noise caused by the data-bearing signal on a short loop.

30. The apparatus of claim 29, further comprising means for eliminating the cross-talk noise on the long loop.

31. The apparatus of claim 27, further comprising means for creating a disjoint spectrum with a second bit loading pattern of a second data-bearing signal on a second communication loop within the plurality of communication loops.

32. The apparatus of claim 27, further comprising means for limiting a percentage loss of a bit rate on a second communication loop, the percentage loss defined by a loss algorithm as follows:

$$\text{Loss} = 1 - \frac{Rate_1}{Rate_0},$$

where $Rate_0$ is a bit rate of the second communication loop in the absence of a noise-producing signal on a first communication loop and $Rate_1$ is a bit rate of the second communication loop in the presence of a noise-producing signal on the first communication loop.

33. An apparatus, comprising:
  a modem configured to transmit a data-bearing signal over a plurality of tones on a communication loop within a plurality of communication loops;
  a cost calculation module configured to calculate a minimum tone cost according to a tone cost algorithm, the tone cost algorithm defining a tone cost associated with a selected tone of the plurality of tones based on a predefined loading frequency of the selected tone; and
  a bit loading module configured to determine a bit loading pattern for the data-bearing signal according to the minimum tone cost, wherein the tone cost algorithm is as follows:

$$\text{Cost}(t) = \begin{cases} (t-t_0)^{2n}, & t < t_0 \\ 0, & t \geq t_0 \end{cases},$$

where t comprises the selected tone within the plurality of tones, $t_0$ comprises the predefined loading frequency, and n comprises a positive number determinative of a relative weight.

34. The apparatus of claim 33, wherein:
  the communication loop comprises a short loop; and
  the predefined loading frequency is an upper frequency, within an allowable frequency spectrum, that is higher than a transmission frequency of a second data bearing signal on a long loop within the plurality of communication loops.

35. A method, comprising:
  establishing a training sequence for a multi-carrier communication system;
  determining a bit loading pattern for a plurality of tones in a frequency spectrum;
  determining if the bit loading pattern for the plurality of tones is limited by a minimum allowable transmission power level;
  selecting a first segment of tones of the plurality of tones to load with data if a second segment of tones of the plurality of tones is limited by the minimum allowable transmission power level; and
  selecting the first segment of tones to load with data based upon a predefined loading frequency and a signal-to-noise ratio (SNR) of each tone.

36. The method of claim 35, further comprising calculating a minimum tone cost according to a tone cost algorithm, the tone cost algorithm defining a tone cost associated with a selected tone of the plurality of tones based on the predefined loading frequency and the signal-to-noise ratio (SNR) of the selected tone.

* * * * *